US010980155B2

(12) United States Patent
Yu et al.

(10) Patent No.: US 10,980,155 B2
(45) Date of Patent: Apr. 13, 2021

(54) ARCHITECTURE FOR CRYPTOCURRENCY MINING OPERATION

(71) Applicant: BITMAINTECH PTE. LTD., Singapore (SG)

(72) Inventors: Wei Yu, Xian Ning (CN); Jiahai Su, Chongqing (CN); Linlin Zheng, Shijazhuang (CN)

(73) Assignee: BITMAINTECH PTE. LTD., Singapore (SG)

( * ) Notice: Subject to any disclaimer, the term of this patent is extended or adjusted under 35 U.S.C. 154(b) by 0 days.

(21) Appl. No.: 16/569,132

(22) Filed: Sep. 12, 2019

(65) Prior Publication Data

US 2020/0008320 A1    Jan. 2, 2020

Related U.S. Application Data

(63) Continuation of application No. 16/121,112, filed on Sep. 4, 2018, now Pat. No. 10,455,742.

(60) Provisional application No. 62/553,543, filed on Sep. 1, 2017.

(51) Int. Cl.
*H05K 7/20* (2006.01)
*H04L 9/06* (2006.01)
*H04L 9/32* (2006.01)

(52) U.S. Cl.
CPC ....... *H05K 7/20645* (2013.01); *H04L 9/0637* (2013.01); *H04L 9/3239* (2013.01); *H05K 7/20745* (2013.01); *H05K 7/20836* (2013.01); *H04L 2209/38* (2013.01);
(Continued)

(58) Field of Classification Search
CPC ........... H05K 7/20645; H05K 7/20745; H05K 7/20836; H05K 7/20572; H05K 7/20736; H05K 7/20781; H05K 7/1497; H05K 7/20136; H05K 7/20154; H05K 7/20963; H05K 7/20972; H05K 7/20981; H05K 7/2099; H04L 9/0637; H04L 9/3239; H04L 2209/38; H04L 2209/56; G06F 1/20; E03B 3/28; F28D 1/06; F28D 7/0066; F24F 3/1405; F24F 3/06; F24F 11/0001; F24F 11/83; F24F 2003/1617; F24F 3/1603; F25B 2339/047; B60H 2001/00949; F01P 2060/02; F02M 35/024; F02M 35/10144; G03B 21/16

See application file for complete search history.

(56) References Cited

U.S. PATENT DOCUMENTS 8,498,114 B2    7/2013  Martini
8,943,757 B2    2/2015  Parizeau et al.
9,101,081 B2 *  8/2015  Slaby .................. F24F 7/08
(Continued)

*Primary Examiner* — Binh B Tran
*Assistant Examiner* — Michael A Matey
(74) *Attorney, Agent, or Firm* — Anova Law Group, PLLC

(57) ABSTRACT

The present invention is a modular, energy efficient structure for housing racks of computers specifically designed for mining Bitcoin assets. The fundamental principal towards an optimized mining facility design is to decrease electricity consumption as well as effective construction budget management, ensuring only appropriate business expenditures. The side benefits including improved stability of the facility computer network and electricity supply. The design concept is carried out through a cool/hot air segregation process, which results in controllable internal facilities temperatures, dust filtration and energy savings.

19 Claims, 2 Drawing Sheets

(52) U.S. Cl.
   CPC ...... *H04L 2209/56* (2013.01); *H05K 7/20572* (2013.01); *H05K 7/20736* (2013.01); *H05K 7/20781* (2013.01)

(56) References Cited

U.S. PATENT DOCUMENTS

| | | | |
|---|---|---|---|
| 9,814,160 B2* | 11/2017 | Slessman | H05K 7/1497 |
| 9,820,412 B2* | 11/2017 | Karasawa | H05K 7/20745 |
| 9,907,212 B2* | 2/2018 | Parizeau | H05K 7/2079 |
| 9,930,814 B2* | 3/2018 | Endo | G05B 15/02 |
| 10,154,614 B1* | 12/2018 | Phillips | H05K 7/20745 |
| 10,299,408 B1* | 5/2019 | Lachapelle | H05K 7/20745 |
| 2009/0046427 A1 | 2/2009 | Noteboom et al. | |
| 2011/0007474 A1* | 1/2011 | Detore | G06F 1/20 |
| | | | 361/679.48 |
| 2011/0256822 A1* | 10/2011 | Carlson | H05K 7/20345 |
| | | | 454/184 |
| 2012/0067552 A1 | 3/2012 | Chang | |
| 2013/0021746 A1* | 1/2013 | Campbell | H05K 7/2079 |
| | | | 361/679.47 |
| 2014/0038510 A1* | 2/2014 | Bailey | H05K 7/20745 |
| | | | 454/339 |
| 2014/0069127 A1* | 3/2014 | Bailey | H05K 7/20836 |
| | | | 62/96 |
| 2015/0156917 A1* | 6/2015 | Ogawa | G01K 13/02 |
| | | | 361/695 |
| 2015/0208553 A1* | 7/2015 | Bauchot | F24F 11/30 |
| | | | 361/679.47 |
| 2017/0042067 A1 | 2/2017 | Parizeau et al. | |
| 2017/0127573 A1* | 5/2017 | Hirai | H05K 7/20736 |
| 2017/0238444 A1* | 8/2017 | Slessman | H05K 7/20145 |
| | | | 361/679.47 |
| 2019/0277516 A1* | 9/2019 | Duncan | F24F 3/153 |

\* cited by examiner

ARCHITECTURE FOR CRYPTOCURRENCY MINING OPERATION

CROSS-REFERENCES TO RELATED APPLICATIONS

This application is a continuation application of U.S. patent application Ser. No. 16/121,112, filed on Sep. 4, 2018, which claims priority to U.S. Patent Application No. 62/553,543, filed on Sep. 1, 2017, the contents of both are fully incorporated herein by reference.

BACKGROUND

Cryptocurrencies, such as Bitcoin, are mined by a process by which transaction information distributed within a so-called cryptocurrency network is validated and stored on a ledger referred to as a blockchain. The process of validating transactions and committing them to the blockchain involves solving a series of specialized math problems. The term "mining" refers to the processing and confirmation of payments on the cryptocurrency network. What makes the validation process for Bitcoin different from traditional electronic payment networks is that there is no need for an issuing bank, an acquiring bank, merchant accounts or mandatory centralized clearing houses, such as Visa and MasterCard, holding onto funds until they process transactions at the end of each day.

Bitcoin mining is a process that utilizes a long-running, computationally intensive computer program. In addition to running on traditional computers, some participants have designed specialized Bitcoin mining hardware that can process transactions and build blocks much more quickly and efficiently than regular computers. Each Bitcoin miner is competing with all the other miners on the network to be the first one to correctly assemble the outstanding transactions into a block by solving those specialized math problems. In exchange for validating the transactions and solving these problems, Bitcoin miners are rewarded for all of the transactions they process. They receive fees attached to all of the transactions that they successfully validate and include in a block. In addition to transaction fees, miners also receive an additional award for each block they mine. This block reward is also the process by which new bitcoins are created, as specified by the Bitcoin protocol.

Because the reward for mining blocks is so high, the competition to win that reward is vigorous. At any moment, hundreds of thousands of supercomputers all around the world are competing to mine the next block and win that reward. The Bitcoin network has gotten stronger and stronger over the past several years, growing by as much as 10 percent per month. In order to have an edge in this global competition, the hardware used for Bitcoin mining has undergone generational changes, starting with using the CPU of a personal computer. The CPU can perform many different types of calculations including Bitcoin mining, but is designed to be general purpose. Early miners soon discovered that the calculations could be run faster and more efficiently using a graphics card (GPU), which is a computer chip that handles complex 3D imaging algorithms. Aside from being able to process Bitcoin's transactions faster and more efficiently, the graphics card setup in many desktop PCs means that more than one graphics card can be used per computer. But this still isn't the most power-efficient option, as both CPUs and GPUs are very efficient at completing many tasks simultaneously, but consume significant power to do so, whereas Bitcoin mining in essence just needs a processor that performs its cryptographic hash function ultra-efficiently.

This recognition led to the use of the Field Programmable Gate Array (FPGA), which is capable of doing cryptographic hash functions with vastly less demand for power. However, due to the reprogrammable nature of the chip, it had a significantly higher cost for a chip that solved blocks at the same rate as a GPU. The benefit of using FPGAs is that the reduced power consumption means many more of the chips, once turned into mining devices, can be used alongside each other on a standard household power circuit.

As Bitcoin's adoption and value grows, the justification to produce more powerful, power-efficient and economical per-chip devices warrants the significant engineering investments in order to develop the final and current iteration of Bitcoin mining semiconductors: the Application Specific Integrated Circuit, or ASIC. ASICs are super-efficient chips whose hashing power is multiple orders of magnitude greater than the GPUs and FPGAs that came before them. Succinctly, it's a custom Bitcoin engine capable of securing the network far more effectively than before.

Several Bitcoin mining chip manufacturers have focused on optimizing for efficiency, rather than total power, since mining is a very energy-intensive process. Because of the high energy costs for running a powerful Bitcoin miner, many operators have elected to build data centers known as mining farms in locations with cheap electricity. These facilities house many mining operations, and the requirements of these facilities are unlike any other computer facility in terms of power consumption and heat removal. The art is continuing to seek ways to improve the architecture for such mining farms to improve efficiency and lower the power consumption of the process.

One of the most important criteria for efficient mining operation is the effective control of internal facilities temperatures. Operations generally realize an increase of 2.5% power consumption when high temperatures are present in the operations environment. As such, higher temperatures significantly reduce the power consumed, so managing the heat dissipation of the miners (computers) is critically important.

For large capacity mining facilities, the most common heat dissipation tool is the use of suction fans to draw out high temperature air and replace it with cooler air. Unfortunately, these suction fans consume large amount of electricity themselves. For example, a 3000 KW conventional mining facility requires forty-eight suction fans. In total, these suction fans consume 50 KW electricity, which is 1.5% of the mining site capacity.

Moreover, the single largest expense item associated with any mining facility is the cost of the miners. Reducing miners' repair frequency and miners' failure rate will result in increased return of investment. The key to extend miners' life span is dust filtration and humidity reduction. The present invention manages temperature control in the mining farm complex and also incorporates three layers of dust filtration so that the miners operate in a low humidity, minimal dust environment. The optimized mining facility design also reduces operational overhead, increases the stability of computer network and electricity supply of the mining site.

SUMMARY OF THE INVENTION

The present invention is a modular, energy efficient structure for housing racks of computers specifically designed for mining cryptocurrencies such as Bitcoin assets. The fundamental principal towards an optimized mining facility design is to decrease electricity consumption as well as effective construction budget management, ensuring only appropriate business expenditures. The side benefits including improved stability of the facility computer network and electricity supply. The design concept is carried out through a cool/hot air segregation process, which results in controllable internal facilities temperatures, dust filtration and energy savings.

The mining facility design of the present invention is a modular construction. Each module hosts a certain number of megawatts mining capability. In each module, the intake air travels through three layers of dust filtration and is also cooled in this process. First are the dust filtration panels, followed by dust filtration covered water cooling curtains, concluding with a third layer of dust filtration panels to reach the front of the miners to keep the miners operating in optimal temperatures. As the miners generate heat, the heat is vented outdoors via the back of the miners by exhaust fans.

In a preferred embodiment of the present invention, the roof of the mining facility is slanted. This design enlarges air intake volume and decreases air outlet volume. Further, when the neighboring two modules are placed back to back, the heat released from both modules creates currents of air convection upwards, which in turn speeds up the heat dissipation.

These and other features of the present invention will best be understood with reference to the detailed description of the preferred embodiments, together with the drawings listed below.

DETAILED DESCRIPTION OF THE PREFERRED EMBODIMENTS

Figure 1:
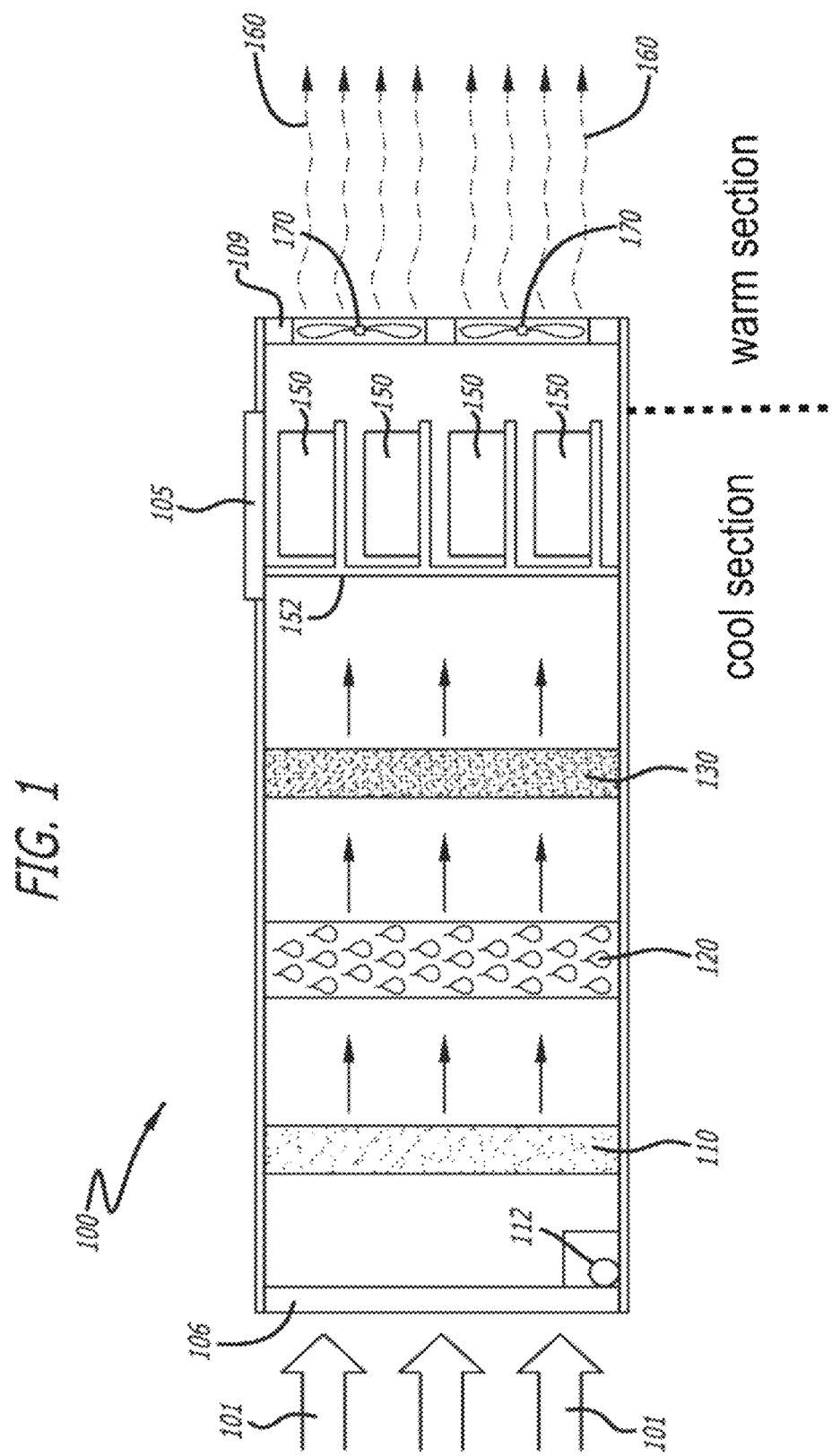
FIG. 1 is a cross sectional view of a module of the present invention.

The present invention is a structure for housing mining computers in a cost-effective and energy efficient manner. A feature of the present invention is that the entire mining facility design is modular, and each module 100 (FIG. 1, not to scale) hosts a certain number of megawatts mining capability. In each module, the intake air 101 travels through three layers of dust filtration and is also cooled in the process. The first stage of filtration is dust panels 110, which remove macroparticles of dust, particulate, and the like. The second stage of filtration is water cooling curtains 120, that remove finer particles and also lower the temperature of the air entering the module. In the final stage of filtration, a secondary layer of dust filtration panels 130 capture microparticles of debris or dust that eluded the first two stages. These three stages of filtration for air entering the modules keep the miners 150 operating in optimal temperatures. Further, as the miners 150 generate heat 160, the heat is vented outdoors via the back of the miners by exhaust fans 170. The present invention results in a reduction of miners 150 (computers) repair frequency as well as the miners' failure rate.

The single largest expense item associated with any mining facility is the cost of the miners 150. Reducing miners' repair frequency and miners' failure rate results in an increased return of investment. The key to extend miners' life span is dust filtration and humidity reduction. The present invention optimizes the process by including three layers of dust filtration, so that the miners operate in low humidity, minimal dust environment. The optimized mining facility design also reduces operational overhead, increasing the stability of computer network and electricity supply of the mining site.

Heat Dissipation Methodology

An optimum operational environment for miners includes a temperature of between 20-30 degrees centigrade and a relative humidity of 30-60%. The design of the present invention focuses on achieving this environment regardless of the number of miners or the external surroundings.

Figure 2:
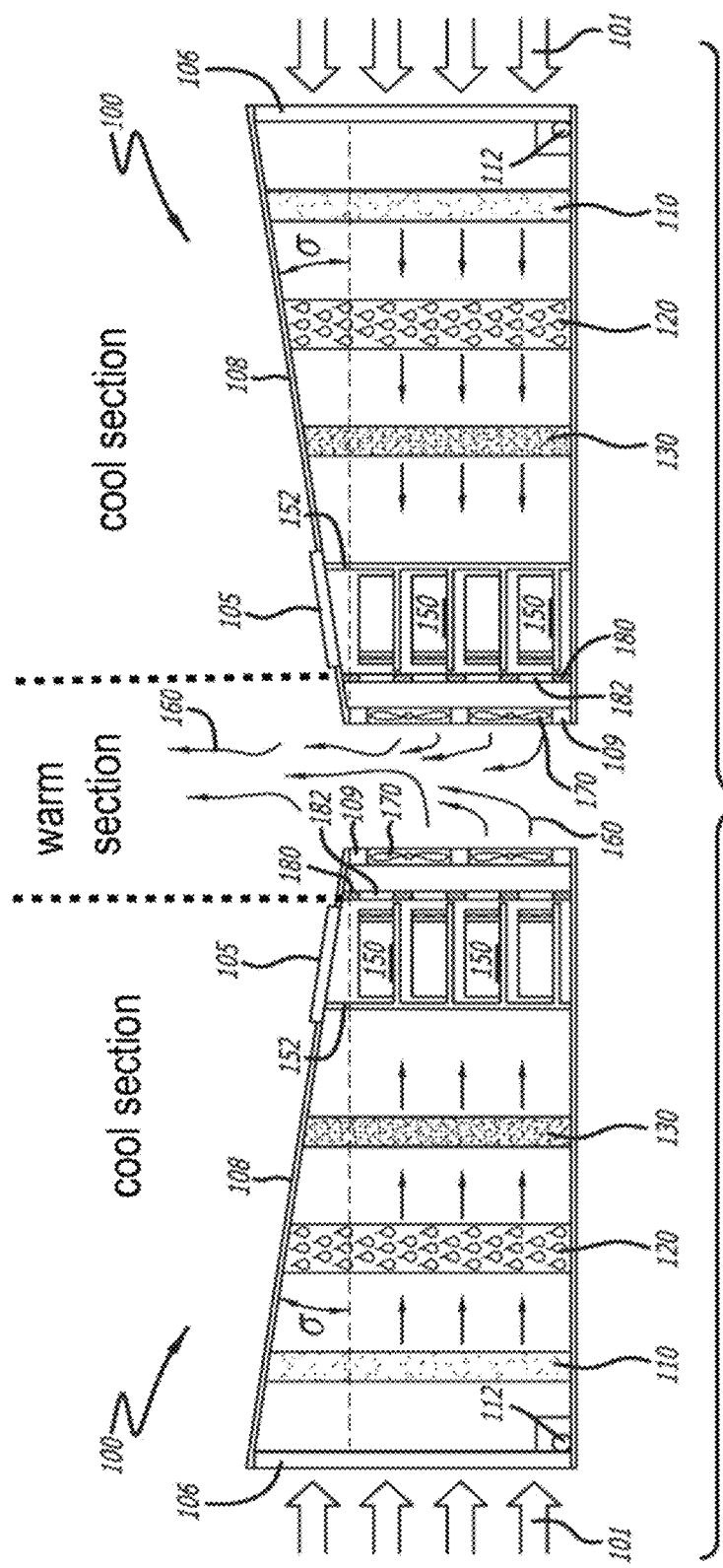
FIG. 2 is a side perspective view of adjacent modules in the mining facility.

In a preferred embodiment of the present invention (FIG. 2, not to scale), the roof 108 of the module 100 is slanted. For example, in a first preferred embodiment the air intake shutters 106 are 4 meters in height and the heat outlet shutters 109 are 3.4 meters in height, oriented at an angle θ of 8.6 degrees to the horizontal. Inclining the roof enlarges the air intake area and decreases the air outlet area. In addition, neighboring modules are placed back to back so that the vented, heated air forms a confluence of rising air 160. The heat released from both modules creates a powerful current of upwardly moving air, which aids in the heat dissipation of heat adjacent the modules.

In a first preferred embodiment, the dust filtration panel 110 and covered water cooling curtains 120 are positioned at 0.2 meters apart, and the dust filtration panel is about 2 meters away from the miner racks 150. Further, the miner racks 150 are located about 1-1.5 m away from the exhaust fans 170 and the exhaust fans are 1.5 m×1.5 m, placed 1 meter above ground. The spacing and arrangement provide the optimum and most efficient use of the space while allowing for full filtration and movement of air through the module 100.

The miners 150 generate significant amount of heat when computing, which results in increased room temperature inside the mining facility. Conventional suction fans used for cooling the space around the miners will attract large amount of dust, create condensation, and is not very effective in drawing and releasing the heat to the outside environment due to the natural airflow outside. This results in overheating of the miners, especially the ones on the top layers of the racks. To overcome this, the present invention includes a PVC panel 180 that is placed behind the miners 150 to further segregate the generated heat from the intaking cool air. This segregation of cool air intake and heat outlet effectively prevents the heat from refluxing, and reduces the air intake area. As a result, the running speed of the exhaust fans 170 and the heat fans in the miners can be adjusted down to save energy. Moreover, the reduced airflow minimizes the dust and condensation, which enable the miners to operate smoothly.

The length and width of each mining module can be adjusted based on the property boundaries, electricity capacity and the number of installed miners. The optimal location of the miner racks is $\tfrac{2}{3}^{rd}$ of the distance from the intake 106 and $\tfrac{1}{3}^{rd}$ of the distance to the exhaust fans 170. This configuration allocates the heat area to $\tfrac{1}{3}^{rd}$ and cool air area to $\tfrac{2}{3}^{rd}$ of the module. This proportional design allows the miner racks to be placed away from the water cooling curtain as much as possible, so that the miners are operating in an appropriate relative humidity. Furthermore, if the humility of the water cooling curtain is too high, it can be adjusted down by adding additional dust filtration panels.

The recommended thickness of the PVC panels 180 is 0.5 cm. The panels are carved out with venting holes 182 that are the same size as the miner exhaust fans to guide the heat to the heat release area. All power jackets, electrical cables, network cables (not shown) are placed within cool air area. The design layout also maximizes the heat releasing area while reduce the heat that builds up in the heat release space.

In a preferred embodiment, the air intake shutters 106 are positioned at respective side walls of the module. For windy and dusty areas, the air intake shutters are motorized for opening and closing using motor 112. This enables the reduction of dust intake when appropriate. In a first preferred embodiment, the first layer of dust filtration panels 110 consists of 15 PPI coarse filtration material. The second layer of dust filtration panels 130 consist of 35 PPI filtration cotton material. The combination of these layers has proven capable of filtering out the smallest macroparticles and microparticles, respectively, of dust. It is preferable that the filtration materials be washable for cleaning and reusable for improved efficiency.

Between the two dust filtration panels is the water cooling curtain 120. Water curtains are very effective air filtration devices, but their use increases the humidity inside of the module. If the humidity inside is too high, it will cause damage to the miners' circuit boards. Thus, care is recommended to limit the use of the water curtain to air temperatures above 30 degrees centigrade, as well as controlling the air intake volume simultaneously to enhance the cooling effect.

In the preferred embodiment, the air intake area shutters 106 are 4 meters high and the racks 152 of miners are 2.9 meters high. This ratio ensures that the cool air intake is sufficient to avoid negative pressure on the miners 150, which could lead to overheating. The modules 100 also include windows 105 that are placed directly above the miner racks 152 for reversing the heat back to the room. In winter or cold weather, if the incoming air 101 temperature is too low (causing the indoor temperature drops below 5 degrees centigrade), the miners 150 won't be able to operate normally. In this situation, the air intake shutters 106 are opened slightly, and the windows 105 above the racks 152 are opened so that the heat flows back through the module 100.

Figure 3:
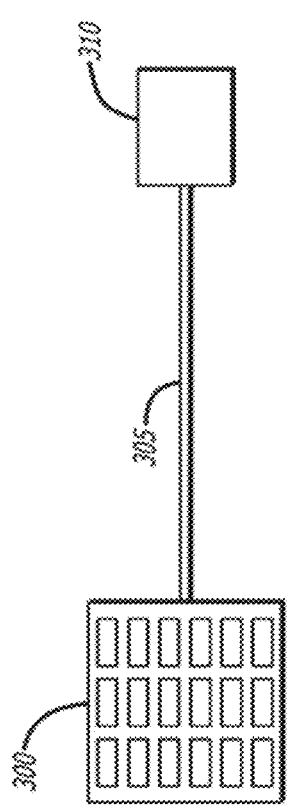
FIG. 3 is a schematic view of a distribution cabinet and power transformer of the present invention.

The design of the module 100 includes various calculations dependent upon the number and type of miners. A determining factor is the total power consumption of all equipment, which then determines the size of the switch cabinets and wires. For example, if there are 180 ant S9 mining machines, 1.4 KW of power consumption per machine times 180 machines equates with 252 KW of total power. In order to determine the wiring requirements, it must first be checked to see whether the output of the power supply transformer 310 meets the power consumption standard, and then one must calculate the length of the wires 305 (FIG. 3) from the transformer to the distribution cabinet 300. Either the aluminum core wire or the copper core wire can be used. For aluminum wire core, 300 $M^2$ aluminum core single strand wires are used, 4 in total, A, B and C 3-phase live wires and 1 null wire. The cables used between the distribution cabinet 300 and the racks 152 are 16 $M^2$ national standard copper wires (the copper wires are divided into 3-phase live wires and available in four colors: A, B, C and null).

The cabinet 300 has its own requirements depending upon the number of miners 150 to be located on each rack 152. For a preferred distribution switch cabinet 300, there is a built-in 630 amp air switch, electricity meter and copper bus bar (for convenience, 18 groups of copper wires are connected to the air switch). The busbar used by the guiderail socket is rated 80 amp, and the guiderail socket used is 10 amp triangle socket. The air switch is rated 80 amp, and each air switch and 11 sockets form a group that includes 10 mining machines (one socket is left idle for backup).

To achieve 3-phase balance, the number of miners 150 occurs in multiples of 3. Without the three machine set, an imbalance in the three phase system could lead to a high temperature failure in the null wire. A loss of the null wire due to burnt-out at the joint could result in serious damage to the electrical equipment. Further, connection of a grounding wire to an adequate ground must be measured, as a failure to adequately grounding or ineffective ground resistance could result in damage to the machines due to electrostatics. It is further preferable that the power supply of the lamps, water curtain motors shutter motor, and network equipment be separated from that of the mining machines.

Power, Quantity and Conversion Efficiency

To select the cables and cooling equipment, the estimated power is the rated power of each mining machines 150 deployed times a factor of 1.2. Certain redundancy is needed to prevent malfunction of the power supplies during use. In this case, one power supply is allotted for one mining machine. The power cord is sized 0.75 $mm^2$ or above, and the length is determined by the placement distance of the power supplies. The power cord socket is the 3-pin socket (national standard). The output wire interface is a PCIE-6pin to make sure that the power has sufficient output wires. For instance, when S7 and S9 are used, there shall be at least 10 PCIE-6pin.

Network

Every 500 mining machines may be driven by 1 M bandwidth and so on (to access external websites, additional bandwidth shall be provided so as not to affect the mining operations of the mining machines). It is recommended that 10 M bandwidth be used for no more than 2000 mining machines. The flow used by a mining machine per month is about 500 M. If the wireless web access card is used, the flow needed shall be calculated based on the number of mining machines.

For connection of the optical fiber, it is recommended that dual networks are adopted to reduce the losses resulting from malfunction of a single network. The type of optical fiber is selected whose upload rate equals the download rate. In the selection of routing, both soft routing and enterprise hard routing are possible. As to the functional requirements for the switch equipment, it is preferred that network administration enabled switches are utilized by both Layer 2 and Layer 3 switching. It is better that the switch be connected downward by two levels so as to reduce the loss of network packets due to multi-level switching and prevent web access failure of the batch equipment due to damage of the higher level switch. Assuming there are 180 S9 mining machines, since the number is not large, there is no need for VLAN division for the 3-level switches and the only connection of switches by soft routing or enterprise routing is enough. Four 48-port switches or eight 24-port switches may be adopted.

There are a number of possible network connections for the miners used with the present invention, including:

Operator: domestic dual line, dedicated Unicom telecommunication line, etc.

Firewall: access to operator's dedicated line and configuration of trust areas.

Core switch: VLAN division (all VLAN), initiate the 3-layer mode; for the uplink port, the IP is connected with the firewall; for the downlink port, the trunk is connected to the access switch and the VLAN gateways are configured.

Access switch: VLAN division each access belongs to one VLAN, access mode configured for port of the mining machine, trunk configured for uplink and default routing is configured to be directed to the core switch.

Management switch: VLAN division, access mode configured for the server port, trunk configured for uplink and default routing is configured to be directed to core switch.

Server: use the esxi host system and create the virtual machine (dhcp, monitoring system, etc.) and dhcp service.

Frame & cabinet: number the frames in advance, establish the corresponding relationship with the switches and maintain the table.

Mining machine: the mining machine is connected to the switch and activates the DHCP function.

Network cable: all cables are labeled at two ends (switch ports, etc.).

The wires shall be copper core wires to minimize mining machine interruption due to inadequate port voltages.

Maximum efforts shall be used not to keep the main network cable from the router to the switch in parallel with the main cable at a short distance (to minimize the interference caused to network transmission by the magnetic field generated due to large current).

While the present invention has been described in terms of one or more preferred embodiments, it is to be understood that the invention is not limited to such preferred embodiments or the depictions herein. Rather, one of ordinary skill in the art will readily understand and appreciate that many modifications and substitutions can be made to the foregoing embodiments, and the invention is intended to include all such modifications and substitutions.

What is claimed is:

1. An architecture for performing computing tasks, comprising:
    a plurality of modules, each module including an air intake port, a particle filtration system, and an air temperature altering filtration system, wherein the particle filtration system includes at least one of a dust panel or a dust filtration panel, and the air temperature altering filtration system includes a water cooling curtain;
    one or more computers arranged within each module, the one or more computers being positioned in a cool section and eject heat into a warm section;
    exhaust fans positioned in the warm section for moving warm air out of the modules;
    wherein the modules are arranged so that the moving warm air from adjacent modules enter a common current of upwardly moving air outside the modules.

2. The architecture for computing tasks of claim 1, further comprising a motorized intake shutter for controlling an opening of an intake shutter at the air intake port.

3. The architecture for computing tasks of claim 1, wherein the water cooling curtain is positioned adjacent to the particle filtration system.

4. The architecture for computing tasks of claim 1, further comprising a window above the plurality of computers.

5. The architecture for computing tasks of claim 1, wherein the modules include a roof having an inclination with respect to a horizontal direction.

6. The architecture for computing tasks of claim 1, wherein the plurality of computers is coupled to a distribution cabinet.

7. The architecture for computing tasks of claim 6, further comprising a power supply transformer.

8. The architecture for computing tasks of claim 1, further comprising a panel separating the warm section from the cool section, the panel having apertures.

9. The architecture for computing tasks of claim 8, wherein the apertures in the panel are of a size equal to a size of fans in the plurality of computers.

10. The architecture for computing tasks of claim 8, wherein the panel is comprised of polyvinyl chloride (PVC).

11. The architecture for computing tasks of claim 1, wherein the module maintains an internal temperature of between 20-30 degrees centigrade and a relative humidity of air inside the module of between 30-60%.

12. The architecture for computing tasks of claim 1, wherein the plurality of computers are positioned two thirds of a distance between the intake shutter and the exhaust fans.

13. A method for arranging a plurality of computing devices in a computing facility, comprising:
    arranging a plurality of modules, each module including an air intake port, a particle filtration system, and an air temperature altering filtration system, wherein the particle filtration system includes at least one of a dust panel or a dust filtration panel, and the air temperature altering filtration system includes a water cooling curtain;
    arranging the plurality of computing devices within the modules, the computing devices being positioned in a cool section and eject heat to a warm section;
    arranging exhaust fans in the warm section for moving warm air out of the modules;
    wherein the modules are arranged so that the moving warm air from adjacent modules enter a common current of upwardly moving air outside the modules.

14. The method of claim 13, further comprising arranging a motorized intake shutter for controlling an opening of an intake shutter at the air intake port.

15. The method of claim 13, further comprising arranging a roof having an inclination with respect to a horizontal direction in each module.

16. The method of claim 13, further comprising arranging a panel separating the warm section from the cool section, the panel having apertures.

17. The method of claim 13, further comprising coupling the plurality of computing devices to a distribution cabinet.

18. The method of claim 13, further comprising positioning the plurality of computing devices at two thirds of a distance between the intake shutter and the exhaust fans.

19. The method of claim 13, further comprising an internal temperature of between 20-30 degrees centigrade and a relative humidity between 30-60% inside each module.

* * * * *